US010275564B2

(12) United States Patent
Ridgeway et al.

(10) Patent No.: US 10,275,564 B2
(45) Date of Patent: Apr. 30, 2019

(54) SYSTEM FOR ANALYSIS OF A REPAIR FOR A STRUCTURE

(71) Applicant: THE BOEING COMPANY, Chicago, IL (US)

(72) Inventors: Larry Dean Ridgeway, Snohomish, WA (US); Gary D. Oakes, Renton, WA (US); Pradeep Krishnaswamy, Redmond, WA (US); Remmelt Andrew Staal, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 274 days.

(21) Appl. No.: 15/186,200

(22) Filed: Jun. 17, 2016

(65) Prior Publication Data

US 2017/0364627 A1 Dec. 21, 2017

(51) Int. Cl.
| | | |
|---|---|---|
| *B64G 1/66* | (2006.01) | |
| *G06F 17/50* | (2006.01) | |
| *B29C 73/04* | (2006.01) | |
| *B64F 5/40* | (2017.01) | |
| *B29C 73/24* | (2006.01) | |

(52) U.S. Cl.
CPC .......... *G06F 17/5086* (2013.01); *B29C 73/04* (2013.01); *B64F 5/40* (2017.01); *G06F 17/5009* (2013.01); *B29C 73/24* (2013.01)

(58) Field of Classification Search
CPC ................................................. G06F 17/5086
See application file for complete search history.

(56) References Cited

U.S. PATENT DOCUMENTS

| 8,209,838 B2 | 7/2012 | Lindgren | |
|---|---|---|---|
| 8,844,108 B2 | 9/2014 | Miller et al. | |
| 2007/0264456 A1* | 11/2007 | Hood | B29C 73/10 428/41.5 |

(Continued)

OTHER PUBLICATIONS

John A, Connor et al. "An Inventory or Intrinsic Sources or Chance Failures in Electronic Parts" J Connor& nbsp;—IEEE , 1964 , pp. 238-250 (Year: 1964).*

(Continued)

*Primary Examiner* — Brian W Wathen
*Assistant Examiner* — Abdou K Seye
(74) *Attorney, Agent, or Firm* — Womble Bond Dickinson (US) LLP (57) ABSTRACT

An apparatus is provided for analysis of a repair for a structure by identifying component parts of the structure that have common material properties and geometric constraints, and based thereon determining a generic repair component for the component parts that also have the common material properties and the geometric constraints. A set of loads are extracted from a loads model of the undamaged structure and redistributed in a loads redistribution model at a damaged or defective portion of the component part. The set of redistributed loads indicate loading incurred by the generic repair component under an external load. The apparatus then uses the redistributed loads to perform an analysis to determine a margin of safety of the generic repair component and, in instances in which the margin of safety is positive, outputs the material properties and geometric constraints of the generic repair component to a fabrication system for production thereof.

18 Claims, 4 Drawing Sheets

(56) References Cited

U.S. PATENT DOCUMENTS

| | | | |
|---|---|---|---|
| 2009/0234616 A1* | 9/2009 | Perkins | G06Q 10/06 |
| | | | 702/184 |
| 2013/0014367 A1* | 1/2013 | Miller | B64F 5/0081 |
| | | | 29/402.08 |
| 2013/0192381 A1 | 8/2013 | Becker et al. | |
| 2013/0231898 A1* | 9/2013 | Oliverius | G06F 17/5018 |
| | | | 703/1 |
| 2014/0200731 A1 | 7/2014 | Evens et al. | |

OTHER PUBLICATIONS

Extended European Search Report dated Nov. 13, 2017 in European application No. 17176475.6.

* cited by examiner

SYSTEM FOR ANALYSIS OF A REPAIR FOR A STRUCTURE

TECHNOLOGICAL FIELD

The present disclosure relates generally to analysis of a structure and, in particular, to determination and analysis of a generic component for repairing a structure.

BACKGROUND

Composites structures in a variety of applications may require repair throughout time. For example, airplanes employing a composite fuselage may experience localized need for repair work under service conditions. When the repair area on the airplane is relatively small, the repair may involve bonding techniques in which a composite patch is bonded over the repair area of the skin. However, these bonding techniques may result in the plies being built up beyond the normal skin thickness, thereby altering the cross sectional profile of the skin. Bonded repairs may also result in other variations that may be difficult to control on a repeatable basis. Moreover, bonding techniques may not be suitable for repairing larger areas such as larger areas in a fuselage skin.

Repairs of a larger area on an airplane fuselage may involve cutting away an entire section of the fuselage, and replacing portions of interior stringers and/or frame members along with the outer skin. A large area repair of this type may require extensive engineering analysis in order to precisely determine the area of the fuselage surrounding the repair area that should be cut out. Further engineering may then be needed to design the required repair components. Additionally, the engineering and analysis of the repair may require knowledge of, and access to, a variety of engineering tools, each of which may have a unique user interface, database, visualization capabilities and operating system. Large area repairs of a composite fuselage may therefore be time consuming, labor intensive and require the involvement of multiple specialized experts.

Therefore, it may be desirable to have a system and method that take into account at least some of the issues discussed above, as well as possibly other issues.

BRIEF SUMMARY

Example implementations of the present disclosure are directed to an improved system, method and computer-readable storage medium for analysis of a repair for a structure including component parts. In particular, the system may combine the output of several analysis tools to provide substantiation data for generic repair component in a time efficient manner. The system may rapidly analyze the suitability of generic repair component for different types of component parts within a structure and corresponding methods of repair, and thereby provide pre-analyzed solutions for repair parts that involve complex geometry.

In some example implementations, a method is provided for analysis of a repair for a structure including component parts. The method may comprise identifying a plurality of component parts of the structure that have common material properties and common geometric constraints, and that are identified from a lay-up design of the structure. The method may also include determining a generic repair component for the plurality of the component parts that has the common material properties and the common geometric constraints.

For a component part of the plurality of component parts, the method may also include extracting a set of loads from a loads model of the structure. The loads model represents the structure in an undamaged state. The method may also include redistributing the set of extracted loads using a loads redistribution model in which a representation of a damaged or defective portion of the component part is replaced or coupled with a representation of the generic repair component. The set of extracted loads are thereby a set of redistributed loads that indicate loading incurred by the generic repair component under external loads applied to the loads model.

The method may also include performing an analysis using the set of redistributed loads to determine a margin of safety for the generic repair component under the set of extracted loads. In at least one instance in which the margin of safety is positive, the method may also include outputting the material properties and geometric constraints of the generic repair component of the at least one instance to a fabrication system for production thereof, the generic repair component being suitable for repairing the component part.

In some example implementations of the method of the preceding or any subsequent example implementation, or any combination thereof, determining the generic repair component includes determining a plurality of generic repair components each of which has the common material properties and the common geometric constraints, the generic repair component being a user-selected one of the plurality of generic repair components.

In some example implementations of the method of any preceding or any subsequent example implementation, or any combination thereof, determining the generic repair component includes determining a bolted or bonded repair that is suitable for replacing or coupling the damaged or defective portion of the component part with the generic repair component.

In some example implementations of the method of any preceding or any subsequent example implementation, or any combination thereof, in at least one instance in which the margin of safety is negative, the method further comprises determining a second generic repair component for the plurality of the component parts in which the second generic repair component is different from the first generic repair component, and for the component part of the plurality of component parts, extracting a second set of loads from the loads model of the structure; redistributing the second set of extracted loads using a second loads redistribution model in which the representation of the damaged or defective portion of the component part is replaced or coupled with a representation of the second generic repair component, and performing an analysis using the second set of redistributed loads.

In some example implementations of the method of any preceding or any subsequent example implementation, or any combination thereof, determining the second generic repair component includes determining a material property or a geometric constraint having a negative impact on the margin of safety, and determining the second generic repair component having the common material properties and the common geometric constraints, excluding the material property or the geometric constraint so determined.

In some example implementations of the method of any preceding or any subsequent example implementation, or any combination thereof, the common material properties include a material type, skin structure, or stiffness, and the common geometric constraints include a doubler geometry, bolt and bolt pattern geometry, or pad-up geometry.

In some example implementations of the method of any preceding or any subsequent example implementation, or any combination thereof, in at least one instance, the structure includes an aircraft, the plurality of the component parts include a plurality of stringers, and the generic repair component includes a bolted hat section formed of carbon-fiber-reinforced plastic (CFRP).

In some example implementations, an apparatus is provided for analysis of a repair for a structure including component parts. The apparatus comprises a processor and a memory storing executable instructions that, in response to execution by the processor, cause the apparatus to implement a number of subsystems, such as a component identifier, repair component engine, load extractor, loads distributer and analysis engine that may be configured to at least perform the method of any preceding example implementation, or any combination thereof.

In some example implementations, a computer-readable storage medium is provided for analysis of a repair for a structure including component parts. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to analysis of a repair for a structure, and more particularly, a generic repair for a number of common component parts thereof. Example implementations will be primarily described in conjunction with aerospace applications in which the structure may be an aircraft including one or more component parts. It should be understood, however, that example embodiments may be utilized in conjunction with a variety of other applications, both in the aerospace industry and outside of the aerospace industry. In this regard, example embodiments may be utilized in conjunction with complex systems, vehicles or the like, such as in the case of aerospace, automotive, marine and electronics.

The system of the present disclosure may extract internal loads from a model that represents the structure in an undamaged state. For example, an original set of extracted loads may be obtained from an existing internal load Finite Element Model that represents the undamaged structure. The system may then redistribute the set of extracted loads using a loads redistribution model that represents a configuration including a repair to a damaged portion of the structure. For example, the extracted set of loads may be redistributed appropriately (using the loads redistribution model) based the configuration including a selected repair component(s) for the repair that can be generic and applicable to a plurality of damaged component parts.

The system may then calculate margins of safety for the generic repair component. If all the margins of safety are positive, a succeeding step may be executed. If any of the margins of safety are negative, the system may reiterate the preceding steps using other generic repair components until identifying a suitable generic repair component having positive margins of safety, or until no predefined generic repair components are left for analysis.

Accordingly, the system of the present disclosure may combine the output of several analysis tools to substantiate data for generic repair components in a time efficient manner. The system may rapidly analyze the suitability of a generic repair component for different types of component parts within a structure. The system may also analyze suitability of corresponding methods for repairing the component parts using the generic repair component. In the context of an aircraft having a large co-cured fuselage section composed of fuselage stringers, for example, the system may rapidly analyze the suitability of a generic repair component for the fuselage stringers within the fuselage section, and a hybrid repair such as a bonded and bolted repair of a fuselage stringer. The system may thereby provide pre-analyzed solutions for generic repair parts that involve unique complex geometry. This results in a rapid deployment of pre-fabricated repair parts thereby providing a significant schedule advantage to associated lines of business.

Figure 1:
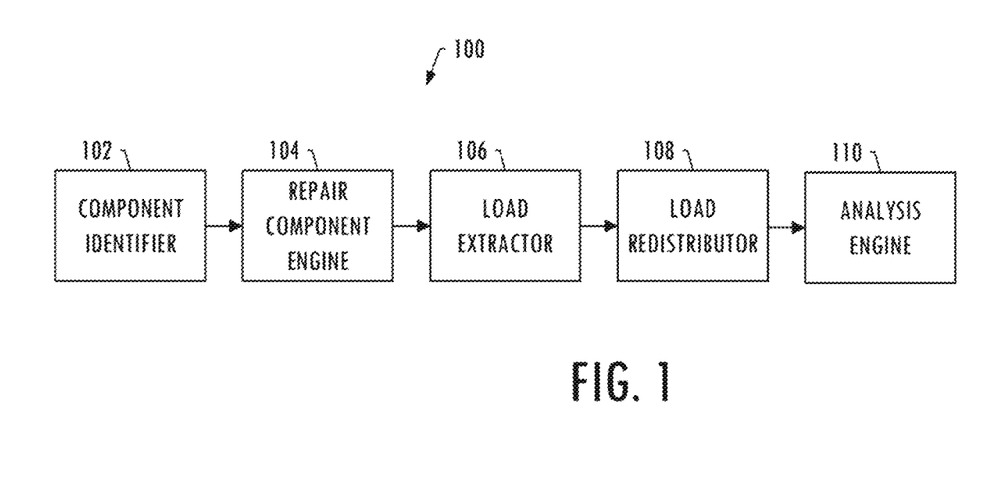
FIG. 1 is an illustration of a structural analysis system, according to example implementations of the present disclosure.

FIG. 1 illustrates a system for analysis of a repair for a structural part 100 according to example implementations of the present disclosure, which may be simply referred to as the "system" herein. The system may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

In accordance with example implementations of the present disclosure, the system 100 is configured to perform various functions or operations to enable analysis of a repair for a plurality of component parts of a structure. The system may be configured to identify a plurality of component parts of the structure that have common material properties and common geometric constraints, and based thereon determine a generic repair component for the plurality of the component parts. The system may also be configured to extract a set of loads from a loads model that represents the structure in an undamaged state. The system may also be configured to redistribute the set of extracted loads using a loads redistribution model. The set of extracted loads thereby being a set of redistributed loads that indicate loading incurred by the generic repair component under external loads applied to the structure. The system may use the set of redistributed loads to perform an analysis to determine a margin of safety for the generic repair component under the set of extracted loads. In at least one instance in which the margin of safety is positive, the system may be further configured to output the material properties and geometric constraints of the generic repair component of the at least one instance to a fabrication system for production thereof.

The system 100 may include one or more of each of a number of different subsystems (each an individual system) coupled to one another for performing one or more functions or operations. As shown in FIG. 1, for example, the system may include a component identifier 102, repair component engine 104, load extractor 106, load redistributor 108 and/or analysis engine 110 that may be coupled to one another. Although shown as part of the system, one or more of the component identifier, repair component engine, load extractor, load redistributor and/or analysis engine may instead be separate from but in communication with the system. It should also be understood that one or more of the subsystems may function or operate as a separate system without regard to others of the subsystems. And further, it should be understood that the system may include one or more additional or alternative subsystems than those shown in FIG. 1.

As explained in greater detail below, the component identifier 102, repair component engine 104, load extractor 106, load redistributor 108 and analysis engine 110 may be configured to perform respective functions or operations of the system 100. The component identifier may be configured to identify a plurality of component parts of the structure that have common material properties and common geometric constraints. In particular, the component parts and their respective material properties and geometric constraints are identifiable from at least a lay-up design of the structure. In some examples, the common material properties include a material type, skin structure, or stiffness, and the common geometric constraints include a doubler geometry, bolt and bolt pattern geometry, or pad-up geometry. It should be noted, however, that the material properties and geometrics constraints may include other properties and constraints not explicitly contemplated herein.

The repair component engine 104 may be configured to determine a generic repair component for the plurality of the component parts that also has the material properties and the geometric constraints that are common to the plurality of the component parts. In some examples, the repair component engine may determine a plurality of generic repair components that each have the material properties and the geometric constraints that are common to the plurality of the component parts. In these examples, the generic repair component that is determined for the plurality of component parts may be a user-selected one of the plurality of generic repair components.

The load extractor 106 may be configured to extract a set of loads from a loads model of the structure that represents the structure in an original undamaged state. The set of loads are then extracted for the component part of the plurality of component parts, in particular. In these examples, the set of loads may include internal loads that are extracted for the components part. The load redistributor 108 may be configured to redistribute the extracted set of loads using a loads redistribution model to thereby form a set of redistributed loads that indicate loading incurred by the generic repair component under external loads that are applied to the loads model, and more particularly a portion of the loads model that corresponds to a damaged or defective portion of a component part of the structure. The external loads may therefore be equivalent to a load safely carried by the component part prior to incurring damaged. The loads redistribution model may thus represent the structure such that a representation of a damaged or defective portion of the component part (e.g., characteristics of the model that represent the damaged portion or component part) is replaced or coupled with a representation of the generic repair component (e.g., characteristics of the model that represent the generic repair component) to determine the effect on the internal loading due to the generic repair component.

In some of these examples, the repair component engine 104 may further determine a bolted or bonded repair that is suitable for replacing or coupling the damaged or defective portion of the component part with the generic repair component. The bolted or bonded repair, or another suitable repair method, may also be represented within the loads redistribution model.

The analysis engine 110 may be configured to perform an analysis using the set of redistributed loads to determine a margin of safety for the generic repair component under the loading originally extracted by the load extractor (e.g., the set of extracted loads). In instances in which the margin of safety is positive, the analysis engine may be further configured to output the material properties and geometric constraints of the generic repair component of the at least one instance to a fabrication system for production thereof. As, in these instances, the generic repair component is identified as being suitable for repairing the component part based at least in part on the positive safety margin. In particular, the generic repair component of the at least one instance may be identified from a plurality of generic repair components as being optimal for repairing the component part based on an iterative analysis of the plurality of generic repair components including the suitable generic repair component.

In particular or alternatively, for example, in instances in which the determined margin of safety for the generic part is negative, the repair component engine 104 may be configured to determine a second generic repair component for the plurality of the component parts that is different from the first generic repair component. In particular, the repair component engine may determine a material property or geometric constraint that had a negative impact on the margin of safety, and thereby determine a second generic repair component having the material properties and the geometric constraints that are common to the plurality of the component parts, but excluding the material property or geometric constraint determined to negatively impact the margin of safety. Alternatively, in some examples, the analysis engine 108 may be configured to determine the material property or the geometric constraint that had a negative impact on the margin of safety, and transmit the determined material property of geometric constraint to the repair component engine for determining the second repair component based thereon.

The load extractor 106 may then extract a second set of loads from the loads model of the structure, and the loads redistributor 108 may redistribute the second set of extracted loads using a second loads redistribution model in which the representation of the damaged or defective portion of the identified component part is replaced or coupled with a representation of the second generic repair component. The analysis engine 110 may then perform an analysis using the second set of redistributed loads. In these examples, the repair component engine, load extractor, loads redistributor and analysis engine may be configured to automatically reiterate the following steps for determining subsequent generic repair components (e.g., second, third, fourth, and so forth) until a subsequent generic repair component having a positive margin of safety for the loading originally extracted (e.g., the set of extracted loads) is determined.

As previously indicated, the analysis engine 108 may output the material properties and geometric constraints of the generic repair component to a fabrication system for production thereof. In these examples, the fabrication system may be configured to provide a rapid process for fabricating the generic component that may in some instances include a composite part. In some examples, the fabrication system may utilize a Double Vacuum Debulk (DVD) curing cycle for out of autoclave processing for timely fabrication of the generic repair component. In some examples, the fabrication system may utilize three-dimensional (3D) printed lay-up mandrels (LMs), composite LMs and/or machined monolithic LMs for timely fabrication of the generic repair component.

Figure 2A:
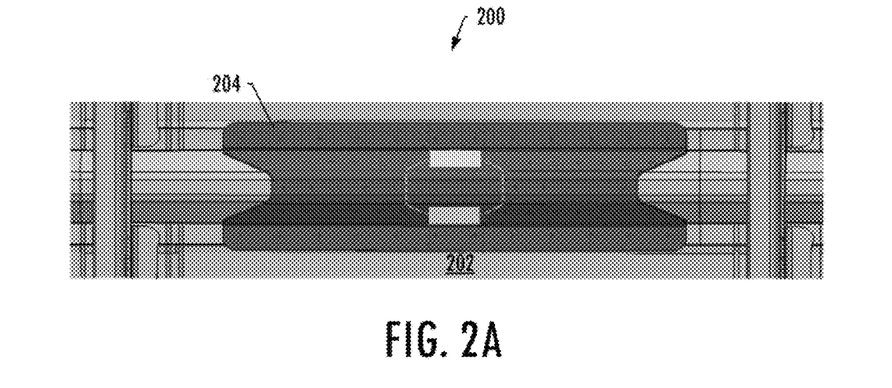
FIGS. 2A, 2B and 2C illustrate a damaged portion of a suitable structure, according to examples implementations of the present disclosure.
Figure 2B:
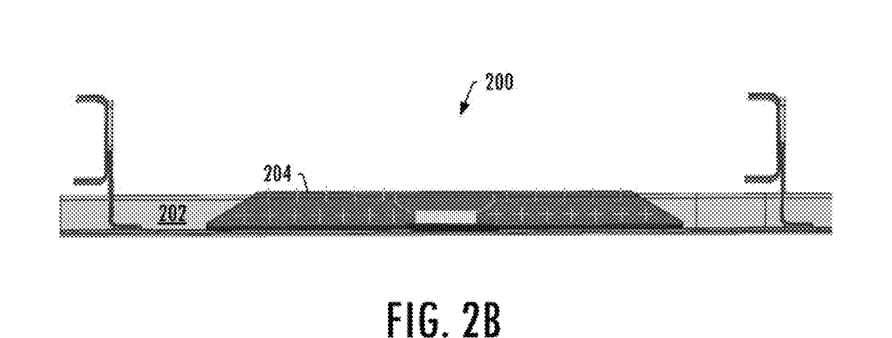
Figure 2C:
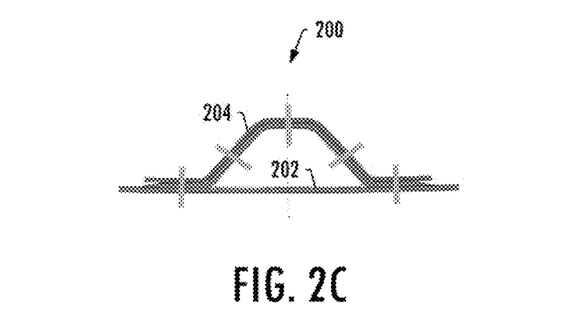

FIGS. 2A and 2B illustrate a portion of a suitable structure 200 including a damaged or defective portion 202, and a suitable generic repair component, 204 according to example implementations of the present disclosure. As shown, a component part of the structure may have a damaged or defective portion therein that is repairable using the generic repair component 204. In particular, the generic repair component may be suitable for a plurality of components of the structure that are common to one another such as by location within a common zone of the structure and/or by having common material properties and geometric constraints. The component parts may include any component parts of the structure having various geometries and/or sizes. As shown in FIGS. 2A, 2B and 2C, in some examples the structure includes an aircraft, and the plurality of the component parts may be or include a plurality of stringers. In these examples, the generic repair component may include a bolted hat section formed of carbon-fiber-reinforced polymer (CFRP), carbon-fiber-reinforced plastic (CFRP) or carbon-fiber-reinforced thermoplastic (CFRTP), as further shown in FIG. 2C.

For instance, example implementations of the present disclosure may provide an integrated analysis tool that provides verification data for the use of generic repair components for repairing component parts of a structure. In the context of an aircraft having a large co-cured fuselage section composed of fuselage stringers, for example, the system may rapidly validate positive margins of safety for the use of pre-cured bolted on CFRP repair parts for repairing the fuselage stringers of the aircraft.

Figure 3:
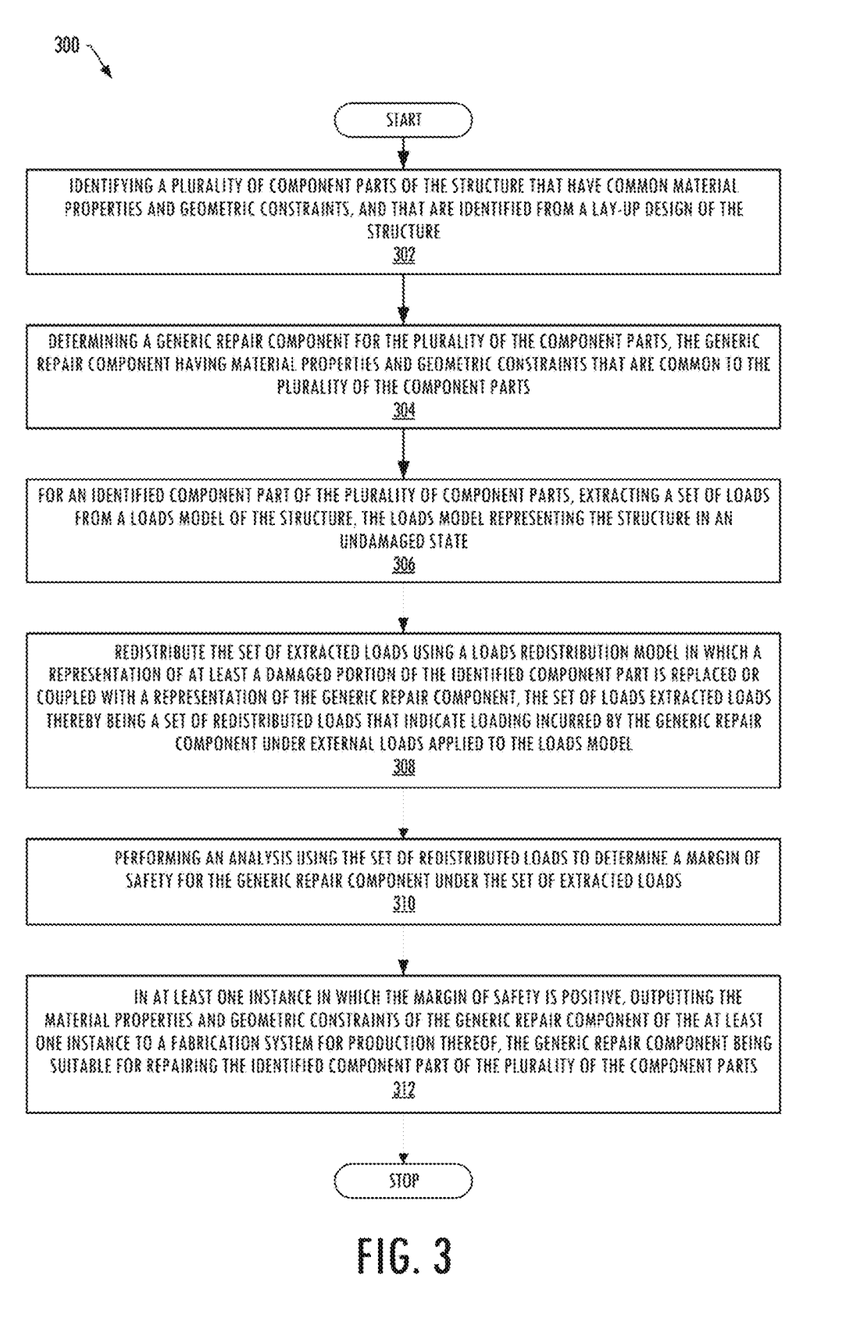
FIG. 3 illustrates various operations of a method for analysis of a repair for a structural part, in accordance with an example implementation.

FIG. 3 illustrates a flowchart including various operations of a method 300 for analysis of a repair for a structure including component parts. As shown at block 302, the method may include identifying a plurality of component parts of the structure that have common material properties and geometric constraints, and that are identified from a lay-up design of the structure. The method may also include determining a generic repair component for the plurality of the component parts that has material properties and geometric constraints that are common to the plurality of the component parts, as shown at block 304. The method may also include, for an identified component part of the plurality of component parts, extracting a set of loads from a loads model of the structure that represents the structure in an undamaged state, as shown in block 306. The method may also include redistributing the set of extracted loads using a loads redistribution model in which a representation of at least a damaged portion of the identified component part is replaced or coupled with a representation of the generic repair component, as shown in block 308. The set of extracted loads are thereby a set of redistributed loads that indicate loading incurred by the generic repair component under external loads applied to the loads model.

The method 300 may also include performing an analysis using the set of redistributed loads to determine a margin of safety for the generic repair component under the set of extracted loads, as shown in block 310. In at least one instance in which the margin of safety is positive, the method may also include outputting the material properties and geometric constraints of the generic repair component to a fabrication system for production thereof, as the generic repair component is suitable for repairing the identified component part of the plurality of the component parts, as shown in block 312.

According to example implementations of the present disclosure, the system 100 and its subsystems and/or components including the component identifier 102, repair component engine 104, load extractor 106, load redistributor 108 and/or analysis engine 110 may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 4:
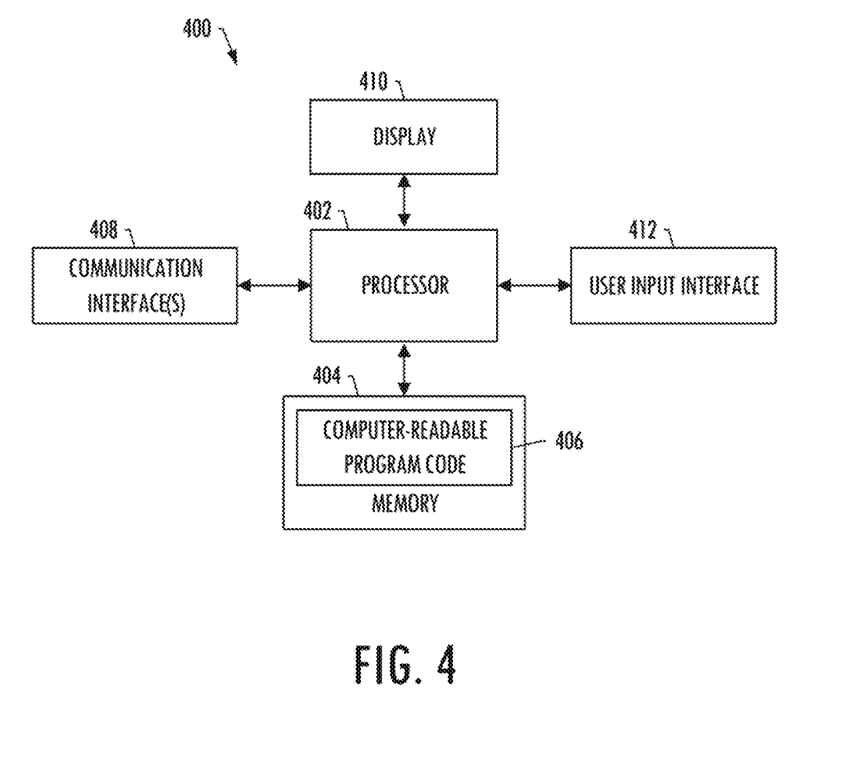
FIG. 4 illustrates an apparatus according to some example implementations.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 402 (e.g., processor unit) connected to a memory 404 (e.g., storage device).

The processor 402 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 404 (of the same or another apparatus).

The processor 402 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like.

The user input interfaces 412 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 400 may include a processor 402 and a computer-readable storage medium or memory 404 coupled to the processor, where the processor is configured to execute computer-readable program code 406 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for analysis of a repair for a structure including component parts, the apparatus comprising a processor and a memory storing executable instructions that, in response to execution by the processor, cause the apparatus to at least:
   identify a plurality of component parts of the structure that have common material properties and common geometric constraints, and that are identified from a lay-up design of the structure;
   determine a generic repair component for the plurality of the component parts to repair the plurality of the component parts, the generic repair component having the common material properties and the common geometric constraints; and for a component part of the plurality of component parts,
   determine a second generic repair component for the plurality of the component parts, including being caused to at least:
      determine a material property or a geometric constraint having a negative impact on the margin of safety; and
      determine the second generic repair component having the common material properties and the common geometric constraints, excluding the material property or the geometric constraint having the negative impact on the margin of safety, the second generic repair component being different from the first generic repair component;
   extract a set of loads from a loads model of the structure, the loads model representing the structure in an undamaged state;
   redistribute the set of extracted loads using a loads redistribution model in which a representation of a damaged or defective portion of the component part is replaced or coupled with a representation of the generic repair component, the set of extracted loads thereby being a set of redistributed loads that indicate loading incurred by the generic repair component under external loads applied to the loads model;
   perform an analysis using the set of redistributed loads to determine a margin of safety for the generic repair component under the set of extracted loads; and in at least one instance in which the margin of safety is positive,
   output the common material properties and geometric constraints of the generic repair component of the at least one instance to a fabrication system for production thereof, the generic repair component being suitable for repairing the component part.

2. The apparatus of claim 1, wherein the apparatus being caused to determine the generic repair component includes being caused to determine a plurality of generic repair components each of which has the common material properties and the common geometric constraints, the generic repair component being a user-selected one of the plurality of generic repair components.

3. The apparatus of claim 1, wherein the apparatus being caused to determine the generic repair component includes being caused to determine a bolted or bonded repair that is suitable for replacing or coupling the damaged or defective portion of the component part with the generic repair component.

4. The apparatus of claim 1, wherein the memory stores further executable instructions that, in response to execution by the processor and in at least one instance in which the margin of safety is negative, cause the apparatus to further at least:
   for the component part of the plurality of component parts,
   extract a second set of loads from the loads model of the structure;
   redistribute the second set of extracted loads using a second loads redistribution model in which the representation of the damaged or defective portion of the component part is replaced or coupled with a representation of the second generic repair component; and
   perform an analysis using the second set of redistributed loads.

5. The apparatus of claim 1, wherein the common material properties include a material type, skin structure, or stiffness, and the common geometric constraints include a doubler geometry, bolt and bolt pattern geometry, or pad-up geometry.

6. The apparatus of claim 1, wherein in at least one instance, the structure includes an aircraft, the plurality of the component parts include a plurality of stringers, and the generic repair component includes a bolted hat section formed of carbon-fiber-reinforced plastic (CFRP).

7. A method of producing a generic repair component for a repair for a structure including component parts, the method comprising:
   identifying a plurality of component parts of the structure that have common material properties and common geometric constraints, and that are identified from a lay-up design of the structure;
   determining a generic repair component for the plurality of the component parts to repair the plurality of the component parts, the generic repair component having the common material properties and the common geometric constraints; and for a component part of the plurality of component parts,
   determining a second generic repair component includes:
      determining a material property or a geometric constraint having a negative impact on the margin of safety; and determining the second generic repair component having the common material properties and the common geometric constraints, excluding the material property or the geometric constraint having the negative impact on the margin of safety, the second generic repair component being different from the first generic repair component;

extracting a set of loads from a loads model of the structure, the loads model representing the structure in an undamaged state; redistributing the set of extracted loads using a loads redistribution model in which a representation of a damaged or defective portion of the component part is replaced or coupled with a representation of the generic repair component, the set of extracted loads thereby being a set of redistributed loads that indicate loading incurred by the generic repair component under external loads applied to the loads model; performing an analysis using the set of redistributed loads to determine a margin of safety for the generic repair component under the set of extracted loads; and in at least one instance in which the margin of safety is positive, outputting the common material properties and geometric constraints of the generic repair component of the at least one instance to a fabrication system for production thereof, the generic repair component being suitable for repairing the component part; and producing the generic repair component by the fabrication system before repairing the component part.

8. The method of claim 7, wherein determining the generic repair component includes determining a plurality of generic repair components each of which has the common material properties and the common geometric constraints, the generic repair component being a user-selected one of the plurality of generic repair components.

9. The method of claim 8, wherein in at least one instance, the structure includes an aircraft, the plurality of the component parts include a plurality of stringers, and the generic repair component includes a bolted hat section formed of carbon-fiber-reinforced plastic (CFRP).

10. The method of claim 7, wherein determining the generic repair component for the plurality of the component parts includes determining a bolted or bonded repair that is suitable for replacing or coupling the damaged or defective portion of the component part with the generic repair component.

11. The method of claim 7 further comprising, in at least one instance in which the margin of safety is negative: for the component part of the plurality of component parts, extracting a second set of loads from the loads model of the structure; redistributing the second set of extracted loads using a second loads redistribution model in which the representation of the damaged or defective portion of the component part is replaced or coupled with a representation of the second generic repair component; and performing an analysis using the second set of redistributed loads.

12. The method of claim 7, wherein the common material properties include a material type, skin structure, or stiffness, and the common geometric constraints include a doubler geometry, bolt and bolt pattern geometry, or pad-up geometry.

13. A computer-readable storage medium for analysis of a repair for a structure including component parts, the computer-readable storage medium having computer-readable program code stored therein that, in response to execution by a processor, cause an apparatus to at least:

identify a plurality of component parts of the structure that have common material properties and common geometric constraints, and that are identified from a lay-up design of the structure;

determine a generic repair component for the plurality of the component parts to repair the plurality of the component parts, the generic repair component having the common material properties and the common geometric constraints; and for a component part of the plurality of component parts, determine a second generic repair component includes being caused to at least: determine a material property or a geometric constraint having a negative impact on the margin of safety; and determine the second generic repair component having the common material properties and the common geometric constraints, excluding the material property or the geometric constraint having the negative impact on the margin of safety, the second generic repair component being different from the first generic repair component;

extract a set of loads from a loads model of the structure, the loads model representing the structure in an undamaged state;

redistribute the set of extracted loads using a loads redistribution model in which a representation of a damaged or defective portion of the component part is replaced or coupled with a representation of the generic repair component, the set of extracted loads thereby being a set of redistributed loads that indicate loading incurred by the generic repair component under external loads applied to the loads model;

perform an analysis using the set of redistributed loads to determine a margin of safety for the generic repair component under the set of extracted loads; and in at least one instance in which the margin of safety is positive, output the common material properties and geometric constraints of the generic repair component of the at least one instance to a fabrication system for production thereof, the generic repair component being suitable for repairing the component part.

14. The computer readable storage medium of claim 13, wherein the apparatus being caused to determine the generic repair component includes being caused to determine a plurality of generic repair components each of which has the common material properties and the common geometric constraints, the generic repair component being a user-selected one of the plurality of generic repair components.

15. The computer readable storage medium of claim 13, wherein the apparatus being caused to determine the generic repair component includes being caused to determine a bolted or bonded repair that is suitable for replacing or coupling the damaged or defective portion of the component part with the generic repair component.

16. The computer readable storage medium of claim 13, wherein the computer-readable program code stored therein, in response to execution by the processor and in at least one instance in which the margin of safety is negative, cause the apparatus to further at least: for the component part of the plurality of component parts, extract a second set of loads from the loads model of the structure; redistribute the second set of extracted loads using a second loads redistribution model in which the representation of the damaged or defective portion of the component part is replaced or coupled with a representation of the second generic repair component; and perform an analysis using the second set of redistributed loads.

17. The computer readable storage medium of claim 13, wherein the common material properties include a material type, skin structure, or stiffness, and the common geometric constraints include a doubler geometry, bolt and bolt pattern geometry, or pad-up geometry.

18. The computer readable storage medium of claim 13, wherein in at least one instance, the structure includes an aircraft, the plurality of the component parts include a plurality of stringers, and the generic repair component includes a bolted hat section formed of carbon-fiber-reinforced plastic (CFRP).

* * * * *